United States Patent
Yamamoto et al.

[11] Patent Number: 5,965,656
[45] Date of Patent: Oct. 12, 1999

[54] PROCESS FOR PREPARING AQUEOUS EMULSION

[75] Inventors: Kazuhiro Yamamoto; Yuzuru Ishida, both of Kitaibaraki, Japan

[73] Assignee: Nippon Mektron, Limited, Tokyo, Japan

[21] Appl. No.: 09/258,640

[22] Filed: Feb. 26, 1999

[30] Foreign Application Priority Data

Mar. 6, 1998 [JP] Japan .................................. 10-073133

[51] Int. Cl.$^6$ ....................................................... C08F 2/16
[52] U.S. Cl. ........................... 524/460; 524/457; 524/458
[58] Field of Search ...................... 524/460, 457, 524/458, 555, 502, 556, 459, 481; 523/201; 525/902; 526/220, 319; 510/417

[56] References Cited

U.S. PATENT DOCUMENTS

| | | | |
|---|---|---|---|
| 4,590,236 | 5/1986 | Konig et al. | 524/460 |
| 4,997,873 | 3/1991 | Suling et al. | 524/458 |
| 5,093,398 | 3/1992 | Rottger et al. | 524/322 |

FOREIGN PATENT DOCUMENTS

| | | |
|---|---|---|
| B 63-14027 | 3/1988 | Japan . |
| B 2-25374 | 6/1990 | Japan . |
| B 3-44593 | 7/1991 | Japan . |
| A 5-263070 | 10/1993 | Japan . |
| A 6-17034 | 1/1994 | Japan . |

*Primary Examiner*—Yogendra Gupta
*Assistant Examiner*—Gregory E. Webb
*Attorney, Agent, or Firm*—Barnes & Thornburg

[57] ABSTRACT

An aqueous emulsion having distinguished water- and oil-repellency and quite free from any organic solvent is prepared by emulsion polymerization of a polyfluoroalkyl group-containing (meth)acrylic acid ester and stearyl (meth)acrylate at a pH condition of 2 to 5.5 in the presence of a betaine type emulsifier or an alkylamine oxide type emulsifier and a nonionic emulsifier.

10 Claims, No Drawings

PROCESS FOR PREPARING AQUEOUS EMULSION

This application claims priority from Japanese application 73133/1998 filed Mar. 6, 1998.

BACKGROUND OF THE INVENTION

1. Field of the Invention

The present invention relates to a process for preparing an aqueous emulsion and more particularly to a process for preparing an aqueous emulsion for use as an effective component of a water- and oil-repellent, etc.

2. Related Art

In the preparation of an aqueous emulsion by copolymerization reaction of a polyfluoroalkyl group-containing (meth)acrylic acid ester and stearyl (meth)acrylate, the copolymerization reaction is generally carried out by emulsion polymerization using a cationic emulsifier and a nonionic emulsifier, where stearyl (meth)acrylate cannot be emulsified without the cationic emulsifier. To facilitate the emulsification, it is well known from the following prior art to use an organic solvent such as acetone, a mixture of acetone and ethylene glycol, glycol ethers, glycol esters, etc.

JP-B-63-14027 discloses simultaneous use of dimethylalkylamine or its salt (cationic emulsifier) and a nonionic emulsifier in the homopolymerization or copolymerization of perfluoroalkylalkyl (meth)acrylate and also discloses addition of acetone to the polymerization system.

JP-B-2-25374 discloses copolymerization of the above-mentioned two kinds of monomers together with 2-hydroxy-3-chloropropyl (meth)acrylate to obtain an effective aqueous emulsion for a water- and oil-repellent, where the emulsion polymerization reaction is carried out in the presence of water and acetone together with both polyoxyethylene alkylphenol (nonionic emulsifier) and dimethylalkylamine acetate salt (cationic emulsifier).

JP-B-3-44593 discloses use of stearyltrimethylammonium chloride as a cationic emulsifier and a mixture of water, acetone and ethylene glycol as a reaction solvent in the invention disclosed in the above-mentioned JP-B-2-25374.

JP-A-5-263070 discloses copolymerization of the above-mentioned two kinds of monomers together with N-methylol acrylamide to obtain an effective aqueous emulsion for a water- and oil-repellent, where the emulsion polymerization reaction is carried out in an aqueous solution of dipropylene glycol monomethyl ether in the presence of both polyoxyethylene alkylphenyl ether (nonionic emulsifier) and alkyltrimethylammonium chloride (cationic emulsifier).

JP-A-6-17034 discloses copolymerization of the above-mentioned two kinds of monomers together with 2-hydroxyethyl acrylate and dimethyl acrylamide to obtain an effective aqueous emulsion for a water- and oil-repellent, where the emulsion polymerization reaction is carried out in a solvent mixture of water and a glycol ether-typed solvent such as dipropylene glycol monoethyl ether, etc. in the presence of both $C_{16}H_{31}O(C_2H_4)_{30}H$ (nonionic emulsifier) and $C_nH_{2n+1}N^+H(CH_3)_2 \cdot CH_3COO^-$ (cationic emulsifier).

Simultaneous use of both nonionic emulsifier and cationic emulsifier in these emulsion polymerization reactions is based on the following grounds: when used as a water- and oil-repellent, polymer particles covered with a cationic emulsifier have a strong adsorption onto fibers and also have a good water- and oil-repellency. In the water- and oil-repellent treatment, usually an antistatic treatment using an antistatic agent comprising an organic or inorganic salt as the main component or a melamine resin treatment using a resin containing an inorganic salt as a catalyst are often carried out at the same time, where emulsion-breaking phenomena are often observed in the water- and oil-repellent treatment bath before application of the effective components to cloth, etc., when there are ionic components such as salts, etc., particularly anionic substances. This is also true in case of dyeing, where an anionic emulsifier as used to disperse the dye acts likewise.

When used in the preparation of an aqueous emulsion, an organic solvent has problems of not only worsening the working circumstance, but also contaminating the effluent water to increase its BOD and COD.

Therefore, to improve the anionic resistance of an aqueous emulsion prepared by using a cationic emulsifier and provide an aqueous emulsion completely free from any organic solvent is indispensable for use of the emulsion as an effective component of a water- and oil-repellent.

SUMMARY OF THE INVENTION

An object of the present invention is to provide a process for preparing an aqueous emulsion having distinguished water- and oil-repellency and anionic resistance, the emulsion being completely free from any organic solvent.

The object of the present invention can be attained by preparing an aqueous emulsion by emulsion polymerization of a polyfluoroalkyl group-containing (meth)acrylic acid ester and stearyl (meth)acrylate at a pH condition of 2 to 5.5, using a betaine type emulsifier or an alkylamine oxide type emulsifier and a noionic emulsifier.

DETAILED DESCRIPTION OF THE INVENTION

Polyfluoroalkyl group-containing (meth)acrylic acid ester for use in the present invention in copolymerization with lower alkyl methacrylate with an alkyl gorup having 1 to 4 carbon atom, benzyl acrylate, benzyl methacrylate or vinylidene chloride can be represented by the following general formula:

where R is a hydrogen atom or a methyl group, $R_1$ is a divalent organic group and Rf is a perfluoroalkyl group having 4 to 20 carbon atoms and includes, for example, the following (meth)acrylate ester compounds.

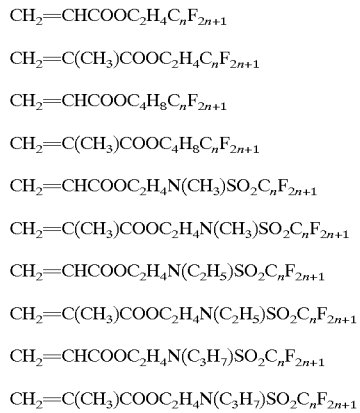

$$CH_2=CHCOOC_2H_4C_nF_{2n}CF(CF_3)_2$$

$$CH_2=C(CH_3)COOC_2H_4C_nF_{2n}CF(CF_3)_2$$

Among the (meth)acrylic acid ester compounds given above, compounds with $R_1=C_2H_4$ are preferably used. Generally, mixtures of linear perfluoroalkyl groups with various n values can be used from the viewpoints of performance and cost.

The polyfluoroalkyl group-containing monomer and the stearyl (meth)acrylate to be copolymerized therewith are subjected to copolymerization in a ratio of the former to the latter of about 30—about 90% by weight: about 70—about 10% by weight, preferably about 45—about 85% by weight: about 55—about 15% by weight, total being 100% by weight, from the viewpoints of water- and oil-repellency and anionic resistance.

A portion (not more than about 10% by weight) of the stearyl (meth)acrylate can be replaced with other fluorine-free monomer such as vinylidene chloride, vinyl chloride, benzyl (meth)acrylate, cyclohexyl (meth)acrylate, lauryl (meth)acrylate, 2-ethylhexyl (meth)acrylate, etc., which can be subjected to the copolymerization reaction at the same time.

The polyfluoroalkyl group-containing copolymer comprising these essential components can be further copolymerized with not more than 10% by weight, preferably about 0.5 to about 7% by weight on the basis of the total copolymer, of a hydroxyl group-containing monomer such as hydroxyethyl (meth)acrylate, hydroxypropyl (meth)acrylate, 3-chloro-2-hydroxypropyl methacrylate, glycerine monomethacrylate, alkyleneglycol mono(meth)-acrylate, etc. These hydroxyl group-containing monomers can improve the adhesion of the water- and oil-repellent agent or improve the durability of the water- and oil-repellent agent by using a cross-linking agent reactive with the hydroxyl group.

The copolymer can be further copolymerized with not more than about 10% by weight, preferably about 0.5 to about 7% by weight on the basis of the total copolymer, of a cross-linkable group-containing monomer such as N-methylol (meth)acrylamide, N-methoxymethyl acrylamide, N-butoxymethyl acrylamide, acrylamide, glycidyl (meth)acrylate, etc. These cross-linkable group-containing monomers can improve the durability of the water- and oil-repellent agent by cross-linking with hydroxyl groups on fiber surfaces or self cross-linking.

Copolymerization reaction is carried out by emulsion polymerization at a pH condition of 2 to 5.5, using a betaine type emulsifier or an alkylamine oxide type emulsifier and a nonionic emulsifier.

The betaine type emulsifier for use in the present invention includes, for example, lauryldimethyl betaine, tetradecyldimethyl betaine, stearyldimethyl betaine, oleylamidodimethyl betaine, coco alkyldimethyl betaine, etc., where stearyldimethyl betaine is preferable.

The alkylamine oxide type emulsifier for use in the present invention includes, for example, dimethyllaurylamine oxide, dimethylcetylamine oxide, dimethylstearylamine oxide, dihydroxyethyllaurylamine oxide, etc., where dimethylstearylamine oxide is preferable.

The nonionic emulsifier for use together with the betaine type emulsifier or the alkylamine oxide type emulsifier, where the betaine type emulsifier or the alkylamine oxide type emulsifier and the nonionic emulsifier are used in a ratio of the former to the latter of about 20—about 80% by weight: about 80—about 20% by weight, preferably about 30—about 70% by weight: about 70—about 30% by weight, total being 100% by weight, includes preferably polyoxyethylene ether derivatives such as polyoxyethylene lauryl ether, polyoxyethylene cetyl ether, polyoxyethylene stearyl ether, polyoxyethylene oleyl ether, polyoxyethylene octylphenyl ether, polyoxyethylene nonylphenyl ether, etc. These emulsifiers are used about 3 to about 9 parts by weight, preferably about 4 to about 7 parts by weight, in total on the basis of 100 parts by weight of the monomer mixtures. During the copolymerization reaction, the reaction system is kept at a pH of 2 to 5.5, preferably 3 to 5.

Stearyl (meth)acrylate turns very unstable without a cationic emulsifier, making the emulsion reaction hard to carry out. Betaine type or alkylamine oxide type emulsifier cannot turn to a cationic form without lowering the pH, resulting in formation of precipitates or deposition of stearyl (meth)acrylate as suspended matters during the polymerization, leading to ultimate failure of emulsion polymerization. Therefore, it is necessary to maintain an above-mentioned pH range. Adjustment of pH to such a range can be carried out usually by addition of an inorganic acid such as phosphoric acid etc. or an organic acid such as acetic acid, citric acid, etc., preferably by addition of the organic acid.

The emulsion polymerization reaction in the presence of such emulsifiers can be carried out in the presence of a radical polymerization initiator. The radical polymerization initiator for use in the present invention includes an organic peroxide, an azo compound, a persulfate, etc., preferably potassium persulfate, ammonium persulfate, 2,2'-azobis(2-amidinopropane).dihydrochloride, etc. The reaction is carried out in an aqueous medium at a temperature of about 40° to about 80° C. for about 1 to about 10 hours, whereby an aqueous emulsion having a solid concentration of about 15 to 35% by weight is formed.

The aqueous emulsion prepared by the present process can be used as a water dispersion type, water- and oil-repellent completely free from any organic solvent upon dilution by water to a solid concentration of about 0.1 to about 1% by weight.

When the pH is controlled to the neutral or the alkaline side, the water- and oil-repellent can keep the bath solution stable or can prevent precipitation of the water- and oil-repellent component or dye component, even if the dye contains an anionic active agent.

PREFERRED EMBODIMENTS OF THE INVENTION

The present invention will be described in detail below, referring to Examples and Comparative Examples.

Example 1

| | |
|---|---:|
| $CH_2=CHCOOC_2H_4C_nF_{2n+1}$ | 300 g |
| (n is 9.0 on the average of mixtures of n = 6 – 14) | |
| Stearyl methacrylate | 175 g |
| Polyoxyethylene phenyl ether | 7.5 g |
| (Emulgen 930, trademark of a product made by Kao Corp., Japan, HLB = 15.1) | |
| Polyoxyethylene phenyl ether | 7.5 g |
| (Emulgen 950, trademark of a product made by Kao Corp., Japan, HLB = 18.2) | |
| Stearyl betaine | 57.7 g |
| (Anhytol 86B, trademark of a product of Kao Corp., Japan, 26%) | |
| Deionized water | 1,225 ml |

[Proportion of total emulsifiers to the monomer mixture: 6% by weight]

The foregoing components were all charged into a 2 L separable glass flask with a stirrer, and 1 g of citric acid was added thereto to make pH 4.4. The mixture was subjected to emulsification treatment at a pressure of 600 Kgf/cm², using a high pressure homogenizer (made by Nihon Seiki K.K., Japan), and then stirred for 30 minutes, while injecting a nitrogen gas thereto.

The inside temperature of the reactor was gradually elevated to 40° C., and then a solution containing 25 g of N-methylol acrylamide dissolved in 100 ml of deionized water and a solution containing 12 g of 2,2'-azobis(2-amidinopropane).dihydrochloride (V-50, trademark of a product made by Wako Pure Chemical Co., Japan) dissolved in 100 ml of deionized water were added thereto. Then, the inside temperature was gradually elevated to 70° C. and the mixture was subjected to reaction at that temperature for 4 hours. After the end of reaction, the reaction mixture was cooled, whereby 1,970 g of an aqueous emulsion having a solid concentration of 26.0% by weight was obtained (yield: 94.3%).

Example 2

In Example 1, the same amount of stearyl acrylate was used in place of stearyl methacrylate, and the same amount of dimethylstearylamine oxide (Unisafe A-SM, trademark of a product made by NOF Corp., Japan; content 35%) was used in place of stearyl betaine. The amount of citric acid was changes to 2 g and pH was set to 4.0.

Example 3

In Example 1, the amount of stearyl methacrylate was changed to 87.5 g and 87.5 g of stearyl acrylate was further used. The same amount of methoxymethylol acrylamide was used in place of N-methylol acrylamide.

Comparative Examples 1 and 2

In Example 1 or 2, a large amount of precipitates was formed during the polymerization reaction, when no citric acid was used.

Comparative Example 3

In Example 1, a double amount (15.0 g) of each of the two kinds of polyoxyethylene phenyl ether was used, without using stearyl betaine and citric acid. A large amount of precipitates was formed during the polymerization reaction.

Comparative Example 4

In Example 1, 53.6 g of stearyltrimethylammonium chloride (Coatamine 86W, trademark of a product made by Kao Corp., Japan; content: 28%) was used in place of stearyl betaine. A stable, milky white aqueous emulsion was obtained.

Comparative Example 5

In Comparative Example 4, a portion (300 ml) of deionized water was replaced with acetone. A stable, milky white emulsion was obtained.

Comparative Example 6

In Example 1, 171.4 g (15% by weight on the basis of monomer mixture) of dimethyllaurylamine oxide (Anhitol 20N, trademark of a product made by Kao Corp., Japan; 35%) was used in place of stearyl betaine, and no citric acid was used. A large amount of precipitates was formed during the polymerization reaction and no stable emulsion was obtained.

Comparative Example 7

In Example 1, 214.3 g (15% by weight on the basis of monomer mixture) of dimethylstearylamine oxide (Unisafe A-SM, trademark of a product made by NOF Corp., Japan; 35%) was used in place of the betaine type emulsifier and the two kinds of nonionic emulsifiers. A large amount of precipitates was formed during the polymerization reaction and no stable emulsion was obtained.

Examples 4 to 6 and Comparative Examples 8 and 9

The aqueous emulsions each obtained in Examples 1 to 3 and Comparative Examples 4 and 5 were diluted by water to treatment bath solid concentrations given in the following Table, and the resulting water- and oil-repellent emulsions were subjected to water- and oil-repellent treatment each of three kinds of fabrics of cotton-polyester mixed fiber cloth, nylon taffeta and polyester amunzen to evaluate their water- and oil-repellency and also subjected to an anionic resistance test.

(Treatment Procedure)

The fabrics were dipped in the treatment bath and then squeezed to predetermined pickups by a mangle, then dried and cured under the conditions given in the following Table

|  | Mixed fiber fabric | Nylon taffeta | Polyester amunzen |
|---|---|---|---|
| Treatment bath solid |  |  |  |
| concentration (%) | 0.5 | 0.5 | 0.25 |
| Pickup (%) | 100 | 40 | 60 |
| Drying condition | 80° C. for 10 min. | 80° C. for 10 min. | 80° C. for 10 min. |
| Curing condition | 150° C. for 3 min. | 170° C. for 1.5 min. | 150° C. for 3 min. |

(Water repellency)

Indicated by number according to JIS L-1092(1992) spray test, where the number ranges from 0 to 100, and larger number shows a better water repellency (Oil Repellency)

Indicated by number according to AATCC TM-118 (1992), where the number ranges 0 to 8, and larger number shows a better oil repellency (Anionic Resistance Rest)

2.5 g of an aqueous solution containing 1% by weight of Kaseron Polyester Blue AUL-S (containing an anionic active agent as a dispersant) as a disperse dye for polyester was added to 50 g of aqueous water-repellent having a solid concentration of 0.5% by weight, whose pH was adjusted to 7, 8 or 9 by addition of a predetermined amount of an aqueous 0.01M NaOH solution, followed by shaking. Cases without precipitation of dye and copolymer resin are marked by ○ and cases with precipitation by X.

The results are shown in the following Table

|  | Water repellency/oil repellency | | | Anionic resistance | | |
|---|---|---|---|---|---|---|
| Example | Mixed fiber | Nylon | Polyester | pH7 | pH8 | pH9 |
| Ex. 4 | 100/5 | 100/6 | 100/5 | X | ○ | ○ |
| Ex. 5 | " | " | " | ○ | ○ | ○ |
| Ex. 6 | " | " | " | X | ○ | ○ |
| Comp. Ex. 8 | 70/5 | 80/6 | " | X | X | X |
| Comp. Ex. 9 | 100/5 | 100/6 | " | X | X | X |

What is claimed is:

1. A process for preparing an aqueous emulsion, which comprising emulsion polymerizing a polyfluoroalkyl group-containing (meth)acrylic acid ester and stearyl (meth) acrylate at a pH condition of 2 to 5.5 in the presence of a betaine type emulsifier or an alkylamine oxide type emulsifier and a nonionic emulsifier.

2. A process according to claim 1, wherein the polyfluoroalkyl group-containing (meth)acrylic acid ester and the stearyl (meth)acrylate are emulsion polymerized in a ratio of the former to the latter of about 30—about 90% by weight: about 70 to about 10% by weight, total being 100% by weight.

3. An aqueous emulsion according to claim 1, wherein the polyfluoroalkyl group-containing (meth)acrylic acid ester is an ester compound represented by the following general formula:

$$CH_2=CRCOOR_1Rf$$

where R is a hydrogen atom or a methyl group, $R_1$ is a divalent organic group and Rf is a perfluoroalkyl group having 4 to 20 carbon atoms.

4. A process according to claim 1, wherein a hydroxyl group-containing monomer is further subjected to the emulsion polymerization.

5. A process according to claim 1, wherein a crosslinkable group-containing monomer is further subjected to the emulsion polymerization.

6. A process according to claim 1, wherein the betaine type emulsifier or the alkylamine oxide type emulsifier and the nonionic emulsifier are used in a ratio of the former to the latter of about 20 to about 80% by weight: about 80 to about 20% by weight, total being 100% by weight.

7. A process according to claim 1, wherein 3 to 9 parts by weight of the betaine type or alkylamine oxide type emulsifier and the nonionic emulsifier are used in total on the basis of 100 parts by weight of monomer mixture.

8. A process according to claim 1, wherein the pH is adjusted by addition of an inorganic acid or an organic acid during the emulsion polymerization.

9. A water- and oil-repellent, which comprises an aqueous emulsion prepared according to a process of claim 1 as an effective component.

10. A water- and oil-repellent according to claim 9, wherein the repellent is used at an alkaline pH.

* * * * *